Figure 1:
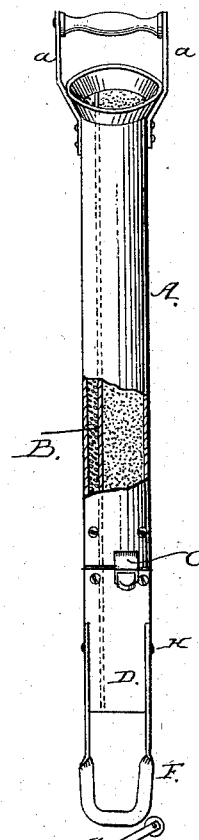
Figure 2:
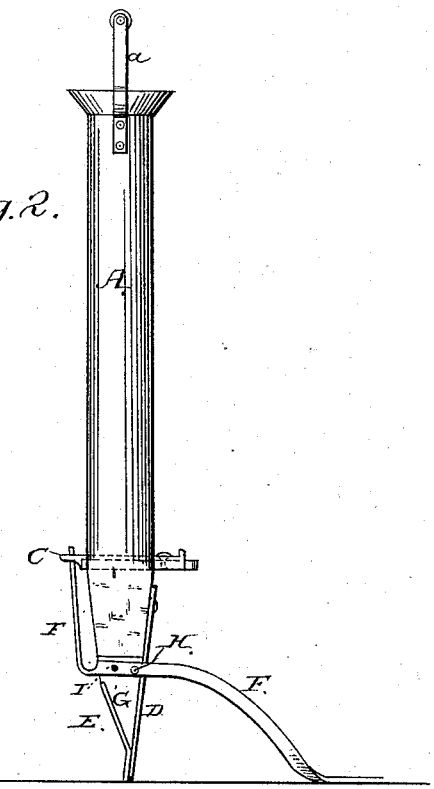
Figure 3:
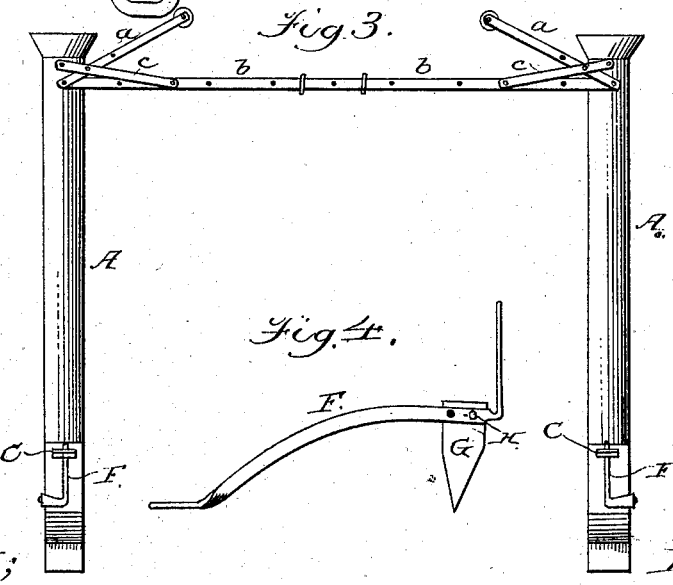
Figure 4:
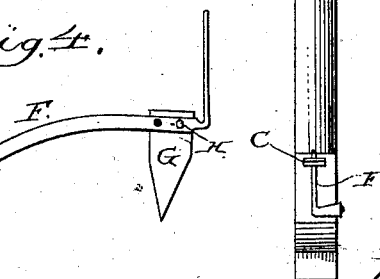

(No Model.)

M. HARRIS.
CORN PLANTER.

No. 255,782. Patented Apr. 4, 1882.

Attest:
N. E. Thomas
L. M. Thomas

Inventor:
Milo Harris

UNITED STATES PATENT OFFICE.

MILO HARRIS, OF JAMESTOWN, NEW YORK, ASSIGNOR OF ONE-HALF TO WM. H. TRUESDALE, OF SAME PLACE.

CORN-PLANTER.

SPECIFICATION forming part of Letters Patent No. 255,782, dated April 4, 1882.

Application filed November 25, 1881. (No model.)

*To all whom it may concern:*

Be it known that I, MILO HARRIS, of Jamestown, in the county of Chautauqua and State of New York, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification.

The object of my invention is to make a cheap and efficient hand seed planter, and one not only less liable to get out of order than those heretofore in use, but one that is easier to work and that will plant all kinds of seeds.

My improvements consist of an improved device for opening the seed-plates and operating the seed-slide; also, in the method of connecting two planters so that they may be operated by one person at the same time, all of which will be more fully understood by the following description and reference to the accompanying drawings, in which—

Figure I is a front elevation. Fig. II is a side elevation. Fig. III is a view showing the manner of connecting two planters. Fig. IV is a step, with triangular plates attached for operating the seed-plates and seed-slide.

In the accompanying drawings, A represents the main tube of the planter, which I prefer to make of sheet metal. Near the base of the tube is a stop and a seed-slide, C, containing the seed-cup, which cup may be regulated so as to drop the desired number of seeds. B is a division of the same tube made by a partition, as shown in Fig. I by the dotted lines, which partition extends below the seed-slide. The object of this division is to enable the person using the planter to drop pumpkin, squash, or any other seed that will not feed well through the seed-cup, in such numbers and at such intervals as he desires.

E, Fig. II, is a steel plate that is securely riveted to the rear side of the tube A, and, in connection with the steel plate D, forms the plates that enter the ground in order to deposit the seed. The plate D is the longer, and is attached to the tube only near the top, in order that it may act as a spring for closing the lower chamber of the tube.

F, Figs. I, II, and IV, is a step that projects in front of the planter, and has rigidly attached to it arms or triangular plates G, and extends in the rear of the planter and upward into or through the seed-slide C, as shown in Fig. II. This step with the triangular plates is secured to the planter by the bolt H, on which it turns. The parts represented by Fig. IV may be made of malleable iron cast in one piece, when so desired.

The planter held by the handle *a* is used similarly to a cane. The plates E and D are inserted into the earth as the person operating the planter brings the lower end of it to the ground in advance of him, and as he advances the step F comes in contact with the ground and turns on the bolt H, and being rigidly attached to the triangular plates G, the steel plates are forced open and the seed deposited. At the same time the seed-slide is drawn back to have the seed-cup filled for the next hill. As the planter is raised from the ground the spring-plate D flies back to its former position and the seed for the next hill falls to the steel plates D and E.

It is sometimes desirable to have one person operate two planters at the same time, and to do this easily and successfully I connect the two planters by the rods *b b*, that are attached to the top of each planter, as shown in Fig. III. The handles *a a* of the planters are unbolted at the top of the planters and fall inwardly, and are made secure in this position by the braces *c c*.

The rods *b b* may be drawn together and the handles put back to the upright position when it is desired to plant rows near together.

I sometimes make the handles with extra holes, so that they may be elevated or lowered to suit the height of the person operating the planter.

I claim—

1. In combination with seed-planters that are constructed with spring steel jaws rigidly attached at their top to the main tube or body of the planter, a projecting step hinged near the lower end of the planter, having an arm extending upward to operate the seed-slide, and an arm or plates extending downward between the jaws to open them, substantially as shown and described, and for the purpose set forth.

2. In combination with hand seed-planters, the rods $b\,b$, braces $c\,c$, and folding handles $a\,a$, all arranged to operate in the manner shown and described, and for the purpose set forth.

In testimony that I claim the foregoing as my own I have hereto affixed my signature in presence of two witnesses.

MILO HARRIS.

Witnesses:
L. M. THOMAS,
N. E. THOMAS.